United States Patent [19]

Gram

[11] Patent Number: 5,705,112
[45] Date of Patent: Jan. 6, 1998

[54] PROCEDURE FOR THE PRODUCTION OF AN ASSEMBLED OBJECT

[76] Inventor: Jes Tougaard Gram, Pilegardsparken 15, DK-3460 Birkerod, Denmark

[21] Appl. No.: 474,518

[22] Filed: Jun. 7, 1995

Related U.S. Application Data

[63] Continuation of Ser. No. 793,402, filed as PCT/DK90/00182, Jul. 11, 1990, published as WO91/01213, Feb. 7, 1991, abandoned.

[30] Foreign Application Priority Data

Jul. 14, 1989 [DK] Denmark ................... 3490/89

[51] Int. Cl.⁶ ................... B29C 45/13; B29C 45/14
[52] U.S. Cl. ................... 264/242; 264/255; 264/268; 425/130; 425/576; 425/577
[58] Field of Search ................... 425/129.1, 130, 425/573, 576, 577; 264/238, 295, 296, 268, 328.1, 328.7, 250, 255, 264, DIG. 41, 510, 512, 513, 524, 539, 537, 242

[56] References Cited

U.S. PATENT DOCUMENTS

| | | | |
|---|---|---|---|
| 2,713,369 | 7/1955 | Strahm | 264/268 |
| 3,281,295 | 10/1966 | Capucio | 264/255 |
| 3,286,010 | 11/1966 | Van Groningen | 264/242 |
| 4,021,524 | 5/1977 | Grimsley | 264/DIG. 41 |
| 4,040,233 | 8/1977 | Valyi | 264/513 |
| 4,485,064 | 11/1984 | Laurin | 264/264 |
| 4,485,065 | 11/1984 | Hatakeyama et al. | 264/255 |
| 4,518,554 | 5/1985 | Hatakeyama et al. | 264/268 |
| 4,549,337 | 10/1985 | Newell et al. | 264/268 |
| 4,790,117 | 12/1988 | Hansen | 264/524 |
| 4,803,031 | 2/1989 | Ochs et al. | 264/255 |
| 4,988,472 | 1/1991 | Orimoto et al. | 264/273 |
| 5,219,373 | 6/1993 | Hatakeyama et al. | 264/250 |
| 5,447,674 | 9/1995 | Schellenbach | 264/268 |

FOREIGN PATENT DOCUMENTS

| | | |
|---|---|---|
| 83058 | 2/1957 | Denmark . |
| 0073356 | 3/1983 | European Pat. Off. . |
| 1162068 | 1/1964 | Germany . |
| 1163527 | 2/1964 | Germany . |

*Primary Examiner*—Angela Ortiz

[57] ABSTRACT

The invention concerns a procedure for the manufacture of an assembled object intended for repeated assembling and disassembling, e.g. a tube (1) with matching cap (4), and a machine for the execution of this procedure. According to the invention the tube (1) and the cap (4) are cast in the same mould (7) end ejected simultaneously and assembled in the exact position they are to have when used. This can suitably be done by first casting the part (4), which at the boundary surface is placed outermost. When it has assumed its final shape, it serves as an independent mould when producing the other part (1). The first cast part (4) thus contributes to the securing of the core system (9, 10, 11) for the other part (1), whereby the wall thickness of this part can be made especially uniform and thin. The machine for the execution of the procedure can thus cast e.g. the assembled cap (4) and tube (1), and it can, therefore, also be adapted to perform an automatic filling, sealing and possibly stamping of the tube.

13 Claims, 1 Drawing Sheet

PROCEDURE FOR THE PRODUCTION OF AN ASSEMBLED OBJECT

This is a continuation of application Ser. No. 07/793,402, filed as PCT/DK90/00182, Jul. 11, 1990, published as WO91/01213, Feb. 7, 1991, now abandoned.

FIELD OF INVENTION

The invention concerns a procedure to cast an object consisting of at least two separable parts, where each separate part is intended especially for a repeated separating and assembling by means of hands only, such as a plastic tube with its matching cap. The invention also concerns a machine for the performance of this process.

DISCUSSION OF PRIOR ART

There are a number of known methods of producing assembled objects, which are meant for a repeated separation and assembling like a tube and its cap. But in these cases each part is cast, either in its own separate mould, or in the same mould, but placed separately next to each other, so that the parts are not assembled into their final position until the casting and the ejection from the mould have taken place. In the case of a tube and its cap the two parts will be cast in separate moulds, each in its own material, and normally in two different casting machines. Then the cap and plastic tube have to be put together, usually in an automatic machine, before the tube is filled with its contents and sealed, just as the labelling or stamping of the tube has to be fitted into this procedure.

SUMMARY AND OBJECT OF THE INVENTION

The method according to the invention aims at simplifying and automatizing the above procedure.

This invention concerns an improved method and apparatus for producing an assembled object comprising at least two separable parts.

By casting the parts of the object meant to be assembled in the same machine, in the same mould and practically at the same time, and by ejecting them from the mould simultaneously and assembled in the exact position which they are to have when they are used, a number of advantages are obtained, in this case exemplified by a plastic tube and its matching cap:

As the cap is cast in its proper place on the tube before the ejection from the mould, and thus does not need to be placed on the tube after the casting, considerable economies are obtained in time, storage capacity, and possible complications when placing the cap correctly on the tube. As the tube is made in the mould with the cap mounted, there is also the possibility that the tube can be filled with contents and sealed then and there, before it is ejected from the mould with its cap correctly mounted. This means that the whole procedure, from the casting of the tube until the ejection of the filled, sealed and purposefully also stamped tube, can be made as a unity in one machine. This will result in a cheaper, simpler, and improved as well as sterile way of producing materials in tubes. And to such a degree that it may create new and better outlets for this type of products.

A specially suitable production procedure for assembled objects according to the invention is that the part of the object which, in the mutual boundary surface, is placed on the outside in relation to another part of the object, will be cast first. When the first cast part has assumed its final shape, it can serve as an independant moulding part at the production of the other part(s) of the object.

The advantages of the production being made in this order is that when the outer part, in this case the cap, is cooled down after the casting, it will shrink to smaller dimensions both on the outside and the inside as the thermal coefficient 'a' of expansion is positive in the term: $L_T = L_t (1 + _a(T-t))$. The other part of the object, in this case the tube itself, is cast immediately after this in the same mould with its top inside the cap, possibly only after the injection of a parting agent, e.g. silicon spray. When the top of the tube now cools down, it will shrink inside the cap and thus create a very small, but noticeable distance to the cap everywhere, which will ease the unscrewing of the cap when used and the later repeated unscrewings and screwings on.

The injection of a silicon spray or other parting agents may be spared completely if the material of the cap is different from the material of the tube in such a way that they are not welded together, but on the contrary repel each other. The material for the cap can thus suitably have a softnening temperature range which is noticeably higher than the temperature where the material for the tube itself is cast, so that sticking together is avoided.

It should be noted that as the cap is cast first, it can contribute to the fixing of the core of the tube in its right place in the mould, as the core would otherwise easily be shifted to one of the sides when the tube material is injected into the mould. This ensures a uniform thickness of the walls of the tube, which can thus be made thinner saving both material and cooling time.

BRIEF DESCRIPTION OF THE DRAWING

The more detailed advantages and presentation of the invention will appear from the drawing and the description.

DESCRIPTION OF THE PREFERRED EMBODIMENTS

Figure 1:
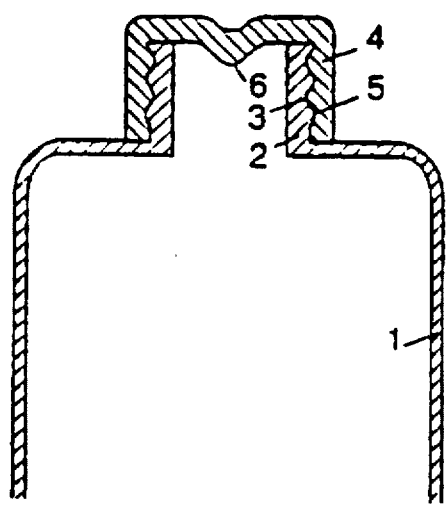
FIG. 1 gives a sectional view of a tube with mounted cap

FIG. 1 shows the upper part of a tube 1, whose top 2 has walls so thick that it can hold the thread 3, by means of which it can secure a matching cap 4. The cap 4 has its own thread 5 and a downwards pointed protuberance 6, which may be used to secure the core during the casting.

Figure 2:
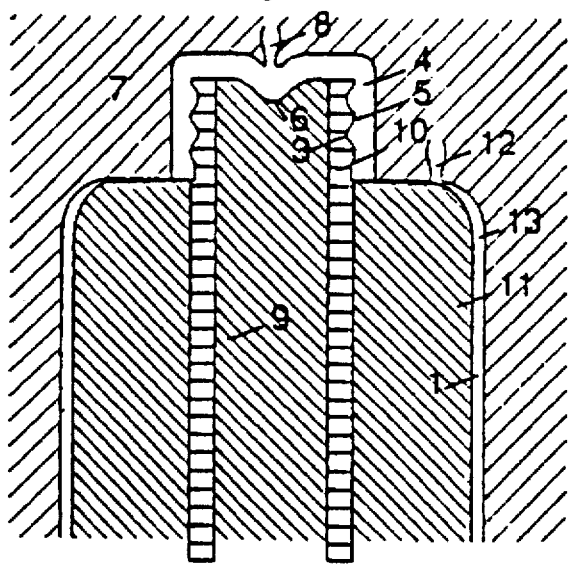
FIG. 2 shows a mould for production of both cap and tube

FIG. 2 shows a mould 7 for the production of both the tube 1 and its matching cap 4. In the mould 7, which forms the outer limit of the cap 4, there is an inlet 8 for plastic material for the cap 4. The inner limit of the cap 4 is defined by a system of suitably concentric core parts consisting of stick 9 at the centre, which has been suitably placed in the middle of the tube 1 and the cap 4. Around the stick 9 there is a pipe-shaped core part 10, which at the top has been designed to form the thread 5 of the cap and the protuberation 6 of the cap. On the outside of this pipe-shaped core part 10 there is the outermost pipe-shaped core part 11, which on FIG. 2 is in the uppermost position and hereby forms the limit of the lowest surface of the cap 4. In the shown position injection of the material for the cap can take place through the inlet 8, and almost at the same time the injection of the material for the tube can suitably be started through another inlet 12 into the tube pipe 13 at an adjusted speed. When the material in the cap 4 has hardened satisfactorily, the tube pipe 10 is drawn downwards and out or the cap 4, which is held in place in the mould 7 by the outermost pipe-shaped core part 11 during this procedure. At the same time a parting agent, silicon spray, may be injected on the inside of the cap 4, e.g. through a nozzle in the central stick 9 (not shown on the drawing). Now the outermost core part 11 is drawn downwards and a little away from the cap 4, thus allowing the tube material to flow into the top 2. The thus obtained placing of the mould's parts is shown in FIG. 3.

Figure 3:
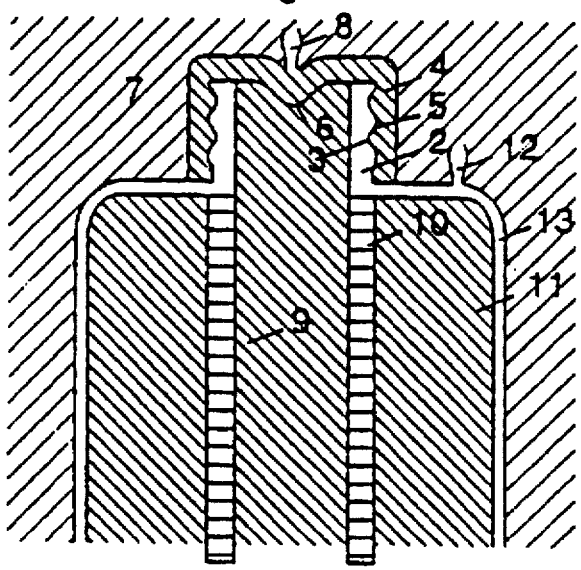
FIG. 3 shows same in a different position.

FIG. 3 shows the placing of the three parts 9, 10 and 11 of the core during the finishing of the casting of the tube pipe 13 and the top 2, the finished cap 4 now serving as a mould, while the protuberation 6 fixes the stick 9, so that the core is not shifted to one of the sides, to ensure a uniform and small wall thickness of the tube. When the tube material has hardened satisfactorily, all the core parts 9, 10 and 11 are drawn out of the tube, but possibly not till the mould has been opened, e.g. in the cross section shown on the drawing, whereafter the tube can be stamped or a label stuck on by a fairly simple automatic procedure, which has not been shown on the drawing.

Figure 4:
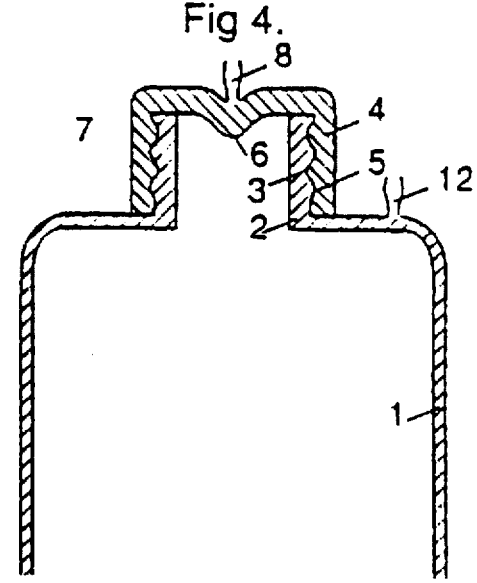
FIG. 4 shows same in a third position.

FIG. 4 shows the uppermost part of the empty tube 1 still placed in the mould 7, but all the core parts 9, 10 and 11 have been removed. The tube can now be filled with its contents, e.g. through a connecting piece mounted at the bottom, but not shown on the drawing, and there may also be a suitable welding mechanism at the bottom, not shown on the drawing, that can seal the tube after the filling. Now the completely finished tube with imprint and contents is ready to be ejected from the mould.

Besides the examples shown on the drawing there may be other ways of conducting the procedure according to the invention and the machine for the production of an assembled object. As an example of this the use of sandwich moulds can be mentioned, as well as a special rotation principle.

For this last variation of the production method an injection moulding machine may be used, where the fixed part and the movable part can be turned, in proportion to each other, around an axis placed centrally in the movable part's direction of travel. Only one part needs to be able to turn, just as the turning capacity can possibly and more suitably be built into one of the moulding parts. The gradual turning, which is suitably made in the same direction all the time, may have the following stages:

First the cap is cast, e.g. in the stationary part, while the movable part has a protruding core, which forms the inside of the cap. The movable part is now drawn away from the fixed part so that the core goes clear, while the cap remains in the fixed part.

The movable part is now turned until the tube mould with its core is outside the cap, which serves as a mould for the tube when the two moulding parts are brought together, possibly after a parting agent has been applied.

Then the tube is cast, the core is drawn out, and the tube is moved to the next position, where for instance the text may be imprinted. However, the printing may take place before the core has been drawn out. At the next position the tube can be filled, at the next position it can be sealed, e.g. by welding, and at the last position the now finished, filled and sealed tube is ejected from the mould, which now moves forward and repeats the procedure.

The above rotation principle may also take place in a different way, e.g. by having several procedures at the same stage.

I claim:

1. A method of moulding an assembled object comprising at least two separable parts which are ejected from their common mold while joined together, wherein the separable parts can be separated and reassembled manually, the parts comprising a first part and a second part or parts, the second part or parts having at least a mating portion adapted for the releasable mating engagement within an inner opposing surface of the first part, the first part comprising a cap and having an internal portion on the inner opposing surface, the second part comprising a tube, a neck of the tube having an outer portion for mating with said internal portion of the cap, the method comprising the steps of:

moulding the first part;

allowing the first part to harden for serving as a mould part for the moulding of at least one second part;

moulding the second part or parts against the inner opposing surface of the first part to form the assembled object;

removing the assembled object from the mold with the parts joined together.

2. The method as claimed in claim 1, wherein the step of molding the first part comprises securing and positioning a core against the mold.

3. The method as claimed in claim 2, wherein a core part can be moved during the molding such that the molding of the second part or parts takes place in at least two stages in a most thin walled area.

4. The method as claimed in claim 3, wherein the step of molding the first part comprises positioning a core having at least three core parts within the mold with the core parts in a first relative position to form a first mold cavity for forming the first part, introducing molten material into the first mold cavity to form the first part, and allowing the material to harden at least partially, and the step of molding the second part or parts comprises adjusting the relative positions of at least two of the core parts to form a second mold cavity including a region between the inner opposing surface of the first part and at least one other core part, and injecting material into the second mold cavity for forming the second part or parts.

5. The method as claimed in claim 4, wherein at least one of the core parts remains in the cap, while at least one of the other core parts has a larger diameter than the rest of the core parts such that when one core part is drawn out, it stretches the material in a wall of the second part thinner and longer.

6. The method of moulding an assembled cap and tube container comprising at least two separable parts which are ejected from their common mold while joined together, wherein the separable parts can be separated and reassembled manually, the parts comprising an internally threaded cap for a tube and a tube with an externally threaded neck portion, having at least a mating portion adapted for the releasable mating engagement within the internally threaded cap, the cap and the mating portion of the externally threaded tube representing opposing surfaces, respectively, adapted for releasable mating engagement to releasably secure the cap to the tube, the method comprising the steps of:

moulding the first part;

allowing the first part to harden for serving as a mold part for the molding of at least one second part;

molding of the second part;

removing the assembled object from the mold with the parts joined together, the tube with the cap mounted on top of the tube so that the cap does not need to be placed on the tube after the casting.

7. An apparatus for molding an assembled object, the object comprising at least two separable parts, the parts comprising a first part having an inner surface having releasable mating formations and a second part or parts having a mating outer surface portion with corresponding mating formations for releasable mating engagement with the inner surface of the first part to releasably secure the parts together, the apparatus comprising:

- an outer mold part having an internal cavity and an internal surface forming a cavity shaped for forming the outer surface of an assembled object;
- an inner core positioned within said internal cavity and having an outer surface spaced in at least some areas from the internal surface of the outer mold part, the outer surface of the inner core being shaped for forming internal surfaces of the first part; and
- the inner core comprising at least one core part, having an outer surface portion shaped to form mating inner surface formations on the first part, and being movable between a first position in which the outer surface portion faces an opposing portion of said outer mold part to form a mold cavity for molding the first part, and a second position in which the mold cavity is increased for molding the second part or parts, whereby the inner surface of the first part forms part of the mold cavity for molding the second part or parts.

8. The apparatus as claimed in claim 7, wherein the inner core comprises at least two concentrically placed and mutually movable core parts.

9. The apparatus as claimed in claim 8, wherein the second core part is movable between a first position forming two separate mold cavities while the first part is molded and a second position forming a single mold cavity as molding of the second part or parts is completed.

10. The apparatus as claimed in claim 7, wherein the outer mold part has at least two inlets for supplying material to different areas of the mold cavity.

11. The apparatus as claimed in claim 9, wherein the apparatus for molding the assembled object is equipped with mechanisms for supplying different materials in the internal cavity, where the core part has been placed during the molding.

12. The apparatus as claimed in claim 9, wherein the inner surface of the outer mold part is shaped to form the outer surface of a cap comprising the first separable part of the assembled object and the outer surface of a tube comprising the second part of the assembled object, an outer surface portion of the first core part which is exposed, being threaded to form internal threads on the cap, and the inner core includes an additional core part which has a mold surface which is exposed on retraction of the first core part to form a mold cavity for molding a neck of the tube.

13. The apparatus as claimed in claim 7, wherein the apparatus is rotatable and has multiple stations, the stations comprising a first station for molding of the first part, a second station for molding of the second part, and additional stations for filling, sealing, and adding identifying indicia.

* * * * *